March 28, 1939. N. M. COUTY 2,152,537
DETACHABLE FITTING
Filed Nov. 29, 1937
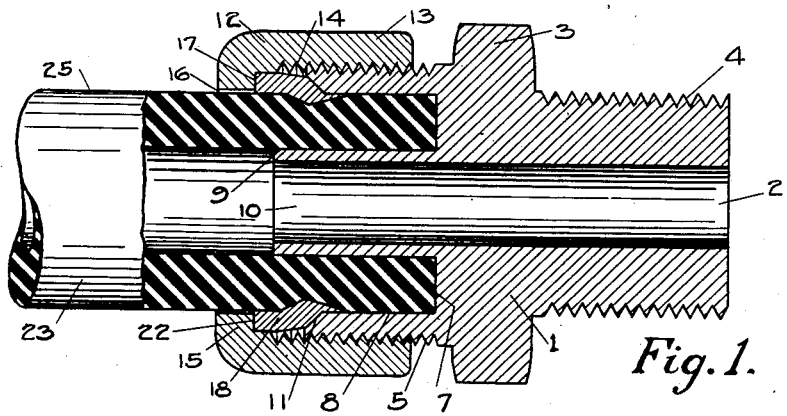
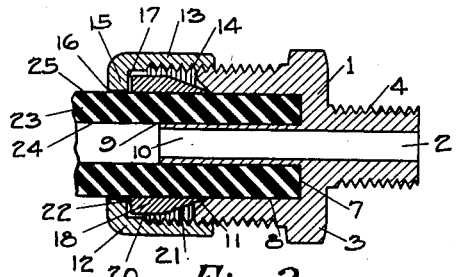
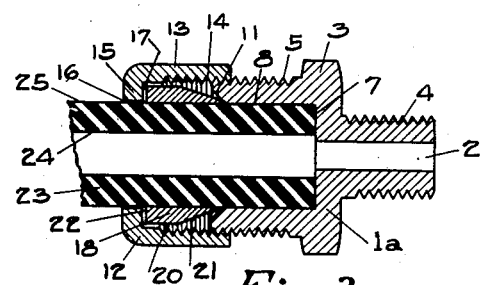
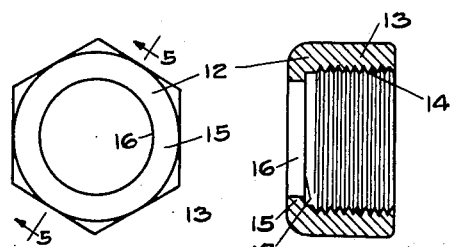
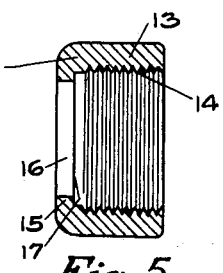
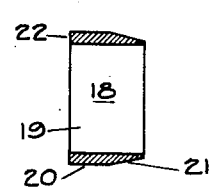
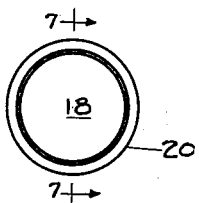
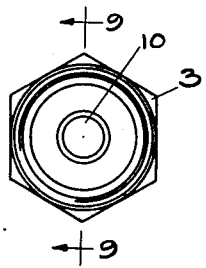
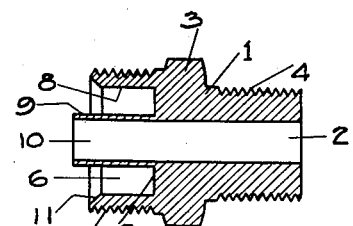
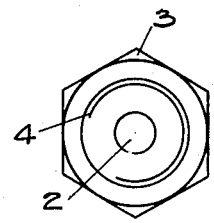
INVENTOR
NORMAN M. COUTY
BY Toulmin & Toulmin
ATTORNEYS Patented Mar. 28, 1939

2,152,537

UNITED STATES PATENT OFFICE 2,152,537

DETACHABLE FITTING

Norman M. Couty, Detroit, Mich., assignor to The Flex-O-Tube Company, Detroit, Mich., a corporation of Delaware Application November 29, 1937, Serial No. 177,071

1 Claim. (Cl. 285—86)

This invention relates to detachable fittings.

It is an object of this invention to provide a detachable fitting particularly adapted to provide for screw-threaded attachment for an air hose of resilient material such as rubber, or the like, to screw-threaded nipples or other attachments and/or fittings.

It is an object of this invention to provide such a detachable hose coupling wherein the end of a hose may be detachably secured thereto by compression in such manner as to provide leak-proof connection between the hose and the fitting.

It is a further object of this invention to provide such a hose coupling wherein a solid ring of soft brass is utilized as a compression member for securing the hose end to the coupling by compression of the body material of the hose.

It is a further object of this invention to provide such a coupling wherein a compression ring member of solid construction and inexpensive manufacture may be utilized.

It is a further object of this invention to provide such a construction wherein the compression member, upon compression, will not flow into the threads of the coupling upon the application of compression thereto and will thus eliminate difficulty of assembly.

It is a further object of this invention to provide such a construction wherein an annular compression ring of soft brass may be utilized to apply to a hose end, compression inwardly in radial direction, and also longitudinally or in axial direction, to provide leakproof connection between a hose end and the coupling or fitting.

These and other objects and advantages will appear from the following description taken in connection with the drawing.

In the drawing:

Figure 1 is a section of an illustrative form of coupling constructed according to the principles of this invention in assembled and compressed position of the parts;

Figure 2 is a view similar to Figure 1, but showing the parts assembled, but without application of compression thereto;

Figure 3 is a view similar to Figure 2, but showing a modified form of fitting body;

Figure 4 is a plan view of the compression nut of a coupling as illustrated in Figures 1, 2 and 3;

Figure 5 is a section taken on the line 5—5 of Figure 4;

Figure 6 is an end view of the compression ring of a fitting as illustrated in Figures 1, 2 and 3;

Figure 7 is a section taken along the line 7—7 of Figure 6;

Figure 8 is an end view of the body member of the fitting illustrated in Figures 1 and 2, as seen from the left, looking toward the right;

Figure 9 is a section taken on the line 9—9 of Figure 8; and

Figure 10 is an end view of the structure shown in Figures 8 and 9, as seen from the right of Figure 9, looking toward the left.

Referring to the drawing in detail, a preferred form of coupling body is shown in Figures 1, 2, 8, 9 and 10 and comprises a body member 1 having an axial bore 2 extending therethrough and provided, intermediate its length, with a hexagonal or other non-circular portion 3. At its righthand end, as seen in Figures 1, 2 and 9, the body 1 is provided with screw threads 4 adapted for screw-threaded engagement with any suitable screw-threaded fitting to which the coupling is to be attached.

At its opposite end, the body 1 is provided with exterior screw threads 5 and a countersunk annular recess 6 terminating inwardly of the body 1 in the wall 7, having an outer annular wall designated 8, and an inner annular wall 9 which forms with the bore 2 the cylindrical tail piece 10 which extends axially outwardly from the inner wall 7 beyond the termination of the threads 5. The outer annular wall 8 of the recess 6 is connected by means of the frusto-conical compression surface 11 with the end of the left threaded portion of the body 1, as shown in Figure 9.

While the above-described construction of the member 1 is preferred, it is possible, however, to utilize the principles of this invention by the use of a construction designated 1a in Figure 3, wherein the tail piece 10 is eliminated and wherein the bore 2 directly joins the inner end wall 7 of the body member 1a. Save for the elimination of the tail piece 10, the construction of the member 1a is otherwise the same as the above-described construction of the member 1.

The compression nut illustrated in Figures 4 and 5 is generally designated 12 and comprises a cylindrical portion 13 of hexagonal or other non-circular section having an internal bore provided with threads 14 which are adapted for engagement with the threads 5 of the body member 1 or the body member 1a. The compression nut 12 is provided at one end with an inwardly directed annular flange 15 terminating in the cylindrical surface 16 which is adapted for close engagement with the exterior surface of a hose to be connected to the body member 1. The inner wall of the flange 15 is designated 17 and this wall is adapted for abutment with one end of the compression ring or member hereinafter more clearly described.

The compression ring member, or sealing ring, shown in detail in Figures 6 and 7, is designated 18 and comprises an annular solid ring having an internal cylindrical bore 19 surrounded by a wall having a cylindrical surface 20 at one end and an inclined surface 21 extending to the other end thereof, which external wall 21 is designated the compression surface or annular compression surface of the sealing ring 18. At the end of the sealing ring 18, opposite the compression surface 21, the ring terminates in an annular flat surface 22 adapted for engagement with the inner wall 17 of the compression nut 12.

In Figures 1, 2 and 3, the fragmentary portion of a rubber hose designated 23 is shown in its cooperative relation with the parts of a coupling. As shown in Figures 1 and 2, the end portion of the interior cylindrical surface 24 thereof is adapted for close engagement with the exterior surface 9 of the tail piece 10 in the form illustrated in Figures 1, 2 and 9. The exterior cylindrical surface 25 of the hose 23 is adapted to closely engage the outer annular wall 8 in both forms of body as is shown in Figures 1, 2 and 3.

As is clearly shown in the drawings, the angularity of the engaging compression surfaces 11 and 21 is different from that of the compression surface 11 of the body, being substantially greater than that of the compression surface 21 of the sealing ring 18. It is preferred that the inclination of the surface 11 with respect to the axis of the body be between 30 and 45 degrees, while the angularity of the surface 21 with respect to the axis of the sealing ring 18 is preferably between 10 and 20 degrees. The above limits are merely illustrative and preferable and it is to be understood that the angularity of the surfaces may be widely varied to suit the particular dimensions used in the construction of a coupling according to this invention, although it is preferred that the angularity of the surface 11 be greater than the angularity of the surface 21.

As shown in Figures 2 and 3, the end portion of a rubber or other resilient hose 23 may be readily inserted into the annular recess in the body 1 of the assembled, but released, coupling. In assembling the coupling, it is preferred that the compression nut 12 be screwed on to the body 1 only sufficiently far to cause light engagement of the end of the surface 21 of ring 18 with the surface 11 of the body. The hose is then thrust axially into the recess in the body 1 until the end thereof abuts the inner end wall 7 of the body.

In the form illustrated in Figures 1 and 2, the inner wall 24 of the hose 23 will closely engage the outer wall 9 of the tail piece 10. In both forms as illustrated in Figures 1, 2 and 3, the outer wall 25 of the hose 23 will closely engage the outer annular wall 8 of the body. In order to secure the end of the hose 23 to the coupling and provide a tight seal between the end thereof and the wall 7, the compression nut 12 is screwed further onto the body 1 whereby, due to engagement of the inner wall 17 of flange 15 of the compression nut 12 with the surface 22 of the sealing ring 18, the soft brass sealing ring will be thrust axially to the right, as seen in Figures 2 and 3, to the position illustrated in Figure 1.

As will be clearly seen from Figure 1, the soft sealing ring 18 will be deformed due to the difference in angularity between compression surfaces 21 and 11 in such manner as to place the end portion of the hose 23 under axial compression as well as radial compression, and the axial compression will cause secure and tight engagement between the end of the hose and the end wall 7 of the body 1, while the radial compression will produce a zone of radial inward compression in the resilient material of the hose 23, whereby to cause secure engagement of the inner cylindrical surface 24 thereof with the outer annular surface 9 of the tail piece 10 in the form illustrated in Figures 1 and 2. In order to release the hose 23 from the coupling, it is merely necessary that the compression nut 12 be backed off, or screwed off, the body 1 to the left, as seen in Figure 1, to the position shown in Figures 2 and 3, whereby the hose 23 may be readily released by drawing it outwardly from the recess in the body 1.

It is, of course, to be understood that body member 1, or 1a, and the compression nut 12 are to be formed of any suitable material such as brass which is substantially harder than the material from which the sealing ring 18 is formed.

Due to the solid construction of the sealing ring 18, it may be readily, cheaply, and conveniently formed from brass tubing or round stock in an automatic screw machine. Deformation thereof, due to handling or shipping, is negligible, as the material is sufficiently hard to successfully withstand such usage without deformation. Furthermore, due to the nature of the material from which the brass sealing ring or compression ring 18 is formed, the material thereof will not flow into the threads of the nut, and this feature materially facilitates final assembly of the parts of the coupling. By means of the difference in angularity between the compression surfaces 11 and 21, the brass ring may be made solid which obviates the necessity for slotting thereof, while at the same time securing sufficient deformability thereof.

By the use of the principles of this invention, I am enabled to obviate substantially all of the disadvantages found in the former practice of forming sealing rings of such material, but of expensive slotted construction, or of forming the sealing ring of lead or other fusible metal alloys. The expense and deformability in handling and the flowing into and clogging of the threads of the compression nut formerly found to be incident to the use of such sealing rings is totally obviated by the use of the principles of this invention.

It is, of course, to be understood that the above-described structure is merely illustrative of the manner in which the principles of my invention may be utilized and that I desire to comprehend within my invention such modifications as come within the scope of the claim and the invention.

Having thus fully described my invention, what I claim as new and desire to secure by Letters Patent is:

In a coupling, a body member having an annular hose receiving recess formed by two concentric walls and terminating in an annular flat wall, said recess arranged to receive and to closely fit a hose end, a plane frusto-conical compression surface surrounding the entrance to said recess, a deformable soft metal sealing ring adapted to surround a hose in said recess terminating in a frusto-conical plane upper surface at one end having an inclination different from that of said compression surface and engageable therewith and terminating in a cylindrical portion at its opposite end, and thrust nut means screw-threaded on said body member and entirely enclosing said sealing ring for moving the ring axially with respect to said compression surface to cause application of force to a hose in said recess, whereby the hose is forced axially against said annular flat wall and the ring is forced radially inwardly to form a zone of compression about the hose.

NORMAN M. COUTY.